United States Patent [19]

Sprunger

[11] Patent Number: 5,219,435
[45] Date of Patent: Jun. 15, 1993

[54] DISPOSABLE TRAILER HITCH

[76] Inventor: Powell L. Sprunger, 20 Woodview La., Algonquin, Ill. 60102

[21] Appl. No.: 770,165

[22] Filed: Oct. 2, 1991

Related U.S. Application Data

[63] Continuation-in-part of Ser. No. 519,704, May 7, 1990, abandoned.

[51] Int. Cl.⁵ .......................... B60D 1/02; B60D 1/06
[52] U.S. Cl. ...................................... 280/511; 280/507
[58] Field of Search ............... 280/511, 514, 504, 507, 280/491.5, 491.1, 491.2

[56] References Cited

U.S. PATENT DOCUMENTS 2,086,376  7/1937  Bock ................................ 280/511 X
3,841,664 10/1974  Anderson ............................ 280/507

FOREIGN PATENT DOCUMENTS

2247321  3/1974  Fed. Rep. of Germany ...... 280/514
3300439  7/1984  Fed. Rep. of Germany ...... 280/504
1407224  6/1964  France ................................ 280/507
2476554  8/1981  France .............................. 280/491.2
 374065  5/1932  United Kingdom ................ 280/511

*Primary Examiner*—Margaret A. Focarino
*Assistant Examiner*—Kevin Hurley
*Attorney, Agent, or Firm*—Powell L. Sprunger

[57] ABSTRACT

A trailer hitch comprising, a hitching ball for a vehicle having an annular groove below the ball, a hitching member for a trailer having a pair of spaced openings extending therethrough, an elongated U-bolt for passage through the openings and in the groove to retain the hitching member to the ball, and a device for clamping the U-bolt to the hitching member.

7 Claims, 12 Drawing Sheets

DISPOSABLE TRAILER HITCH

CROSS-REFERENCE TO RELATED APPLICATION

This application is a continuation-in-part of application Ser. No. 519,704, filed May 7, 1990 now abandoned.

BACKGROUND OF THE INVENTION

The present invention relates to trailer hitches.

Before the present invention, trailer hitches have been used in which a ball has been provided for a vehicle, such as a car, and a hitching device has been used for the trailer for releasable attachment to the car. The hitching device has normally comprised a locking member which is actuated by a threaded bolt on the hitching device to capture the ball. However, the device is relatively complex, and includes moving parts which may rust during extended use and lock up, resulting in lack of operation, which may require costly repair or replacement. In addition, these hitching devices do not provide sufficient clamping against vertical forces by the hitching device against the ball, and may result in dislodgement of the hitching device from the ball, resulting in possible danger to motorists by the trailer when the trailer becomes detached from the car. Further, these devices are difficult to attach during use since it is difficult to manipulate the locking member to the correct position beneath the ball, particularly when the hitching device has become rusted and the trailer is heavy under loads, and the hitching device may become locked to the ball rendering it difficult to remove the trailer from the car.

SUMMARY OF THE INVENTION

A principle feature of the present invention is the provision of an improved trailer hitch of simplified construction.

The trailer hitch of the present invention comprises, a hitching ball for a vehicle having an annular groove below the ball, a hitching member for a trailer having a pair of spaced openings extending therethrough, an elongated U-bolt for passage through the openings and in the groove to retain the hitching member to the ball, and means for clamping the U-bolt to the hitching member.

A feature of the present invention is that the hitching member may be attached to the ball in a rapid and simplified manner.

Another feature of the invention is that the hitching member may be simply placed on the ball, and the U-bolt is passed through the openings to clamp the hitching member to the ball in a simplified manner.

Yet another feature of the invention is that the clamping means may comprise a pair of nuts on ends of the U-bolt to releasably lock the hitching member to the ball.

A further feature of the invention is that positive locking of the hitching member to the ball is obtained in an improved manner against vertical forces with the U-bolt received in the groove.

Thus, a feature of the invention is that the hitch minimizes the possibility of dislodgement of the hitching member from the ball.

Another feature of the invention is that the hitch thus reduces the possible danger to the driver and to other motorists due to the possible dislodgement of the trailer from the vehicle.

Yet another feature of the invention is the hitch prevents locking during use.

Thus, a feature of the invention is that the hitch assures that the hitching member can be attached to the ball without complications.

Another feature of the invention is that the hitch assures the hitching member can be removed from the ball without complications after use of the device.

A feature of the invention is that the hitch is of simplified construction and reduced cost.

Yet another feature of the invention is the hitch can be constructed in a simplified manner and at a reduced cost.

Another feature of the invention is that the U-bolt for the hitch may be discarded and may be replaced with minimal cost and without the cost of repair.

Yet another feature of the invention is that the hitch may be utilized on existing ball hitches on vehicles.

Further features will become more fully apparent in the following description of the embodiments of the invention and from the appended claims.

DESCRIPTION OF THE PREFERRED EMBODIMENTS

Referring now to FIGS. 1-5, there is shown a trailer hitch generally designated 10 for a vehicle V, such as a car and a trailer T. The hitch 10 has a hitching ball 12 for the vehicle V having an annular groove 14 below the ball 12. This ball 12 may be utilized and accommodated on existing vehicles, and need not be changed.

The hitch 10 has a hitching member 16 for the trailer T. The hitching member 16 has pair of spaced walls 17 and 19, and a lower opening 21 communicating with a chamber or cavity 18 to receive the ball 12. The hitching member 16 may have a cap 20 in the chamber 18 for placement on the ball 12, such that the cap 20 rotates on the ball 12 during use of the hitch 10. The hitching member 16 has a pair of openings 22 and 24 at a location for alignment with the groove 14 when the cap 20 is placed on the ball 12.

Figure 1:
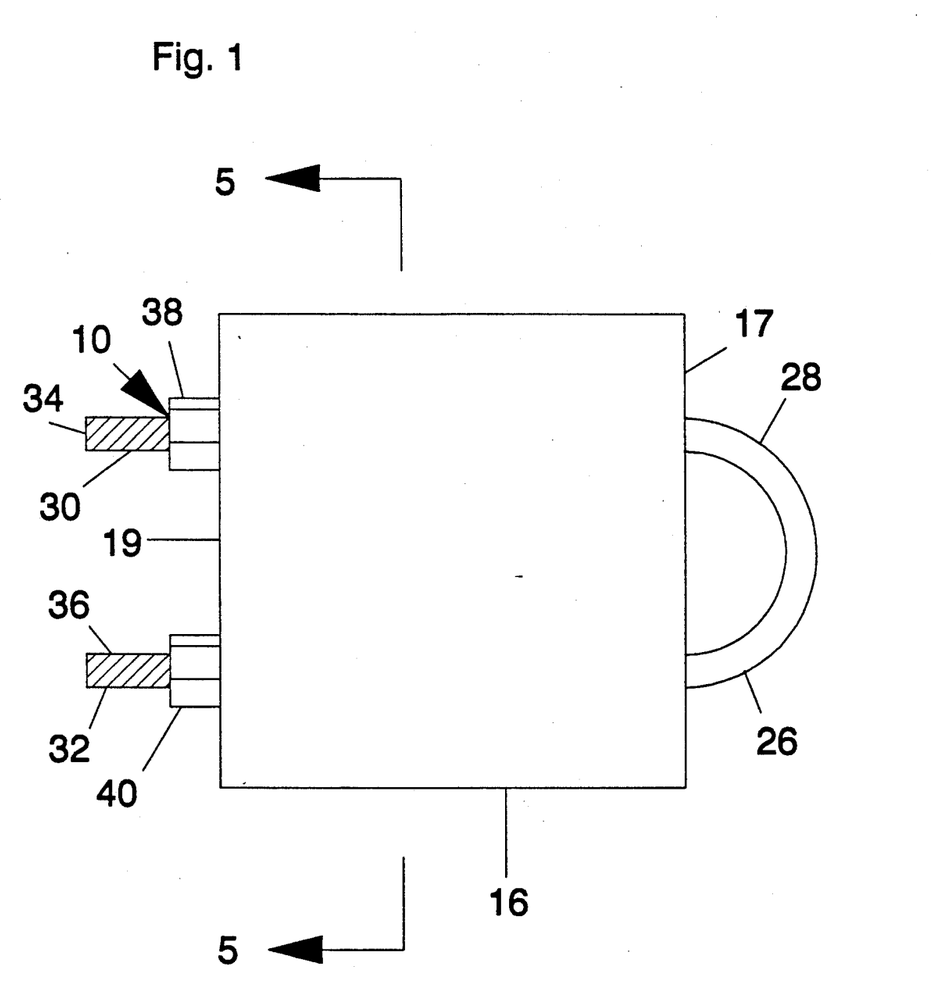
FIG. 1 is a fragmentary top plan view of a trailer hitch of the present invention.
Figure 2:
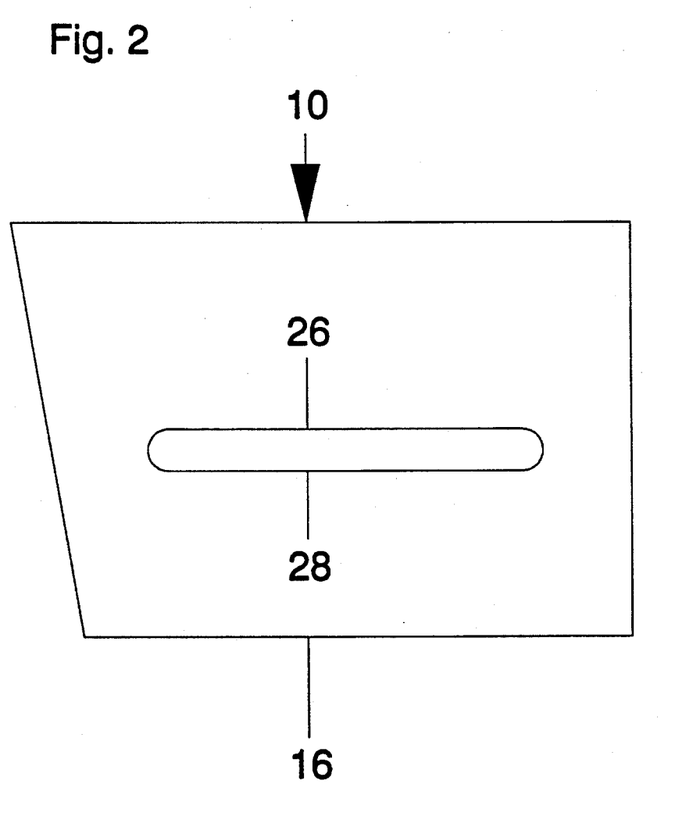
FIG. 2 is a fragmentary elevational view taken from the right side of the hitch of FIG. 1.
Figure 3:
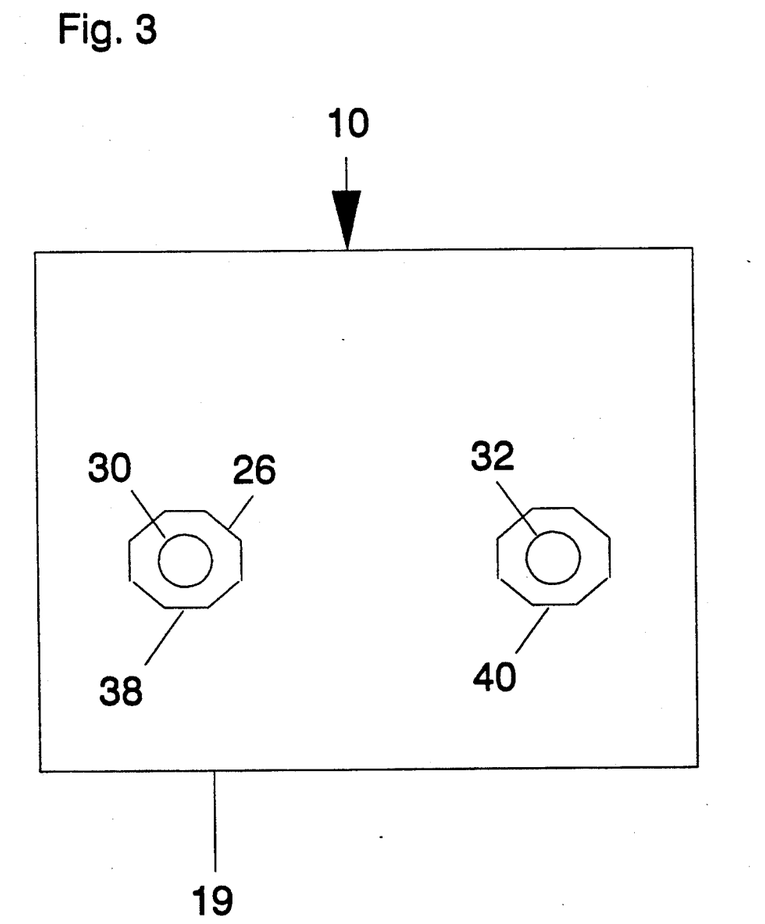
FIG. 3 is a fragmentary elevational view taken from the left side of the hitch of FIG. 1.
Figure 4:
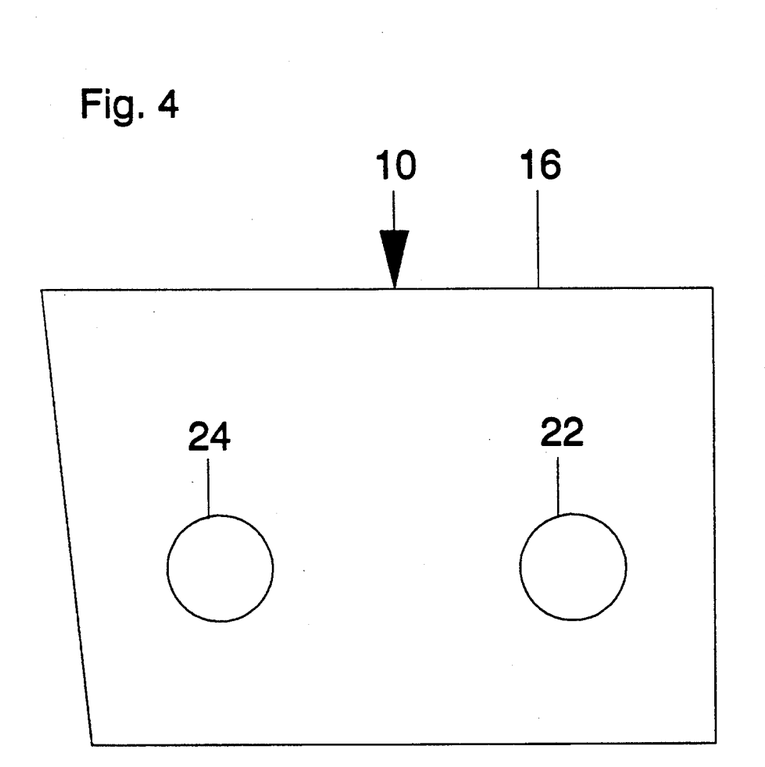
FIG. 4 is a fragmentary elevational view of a hitching member for the hitch of FIG. 1.
Figure 5:
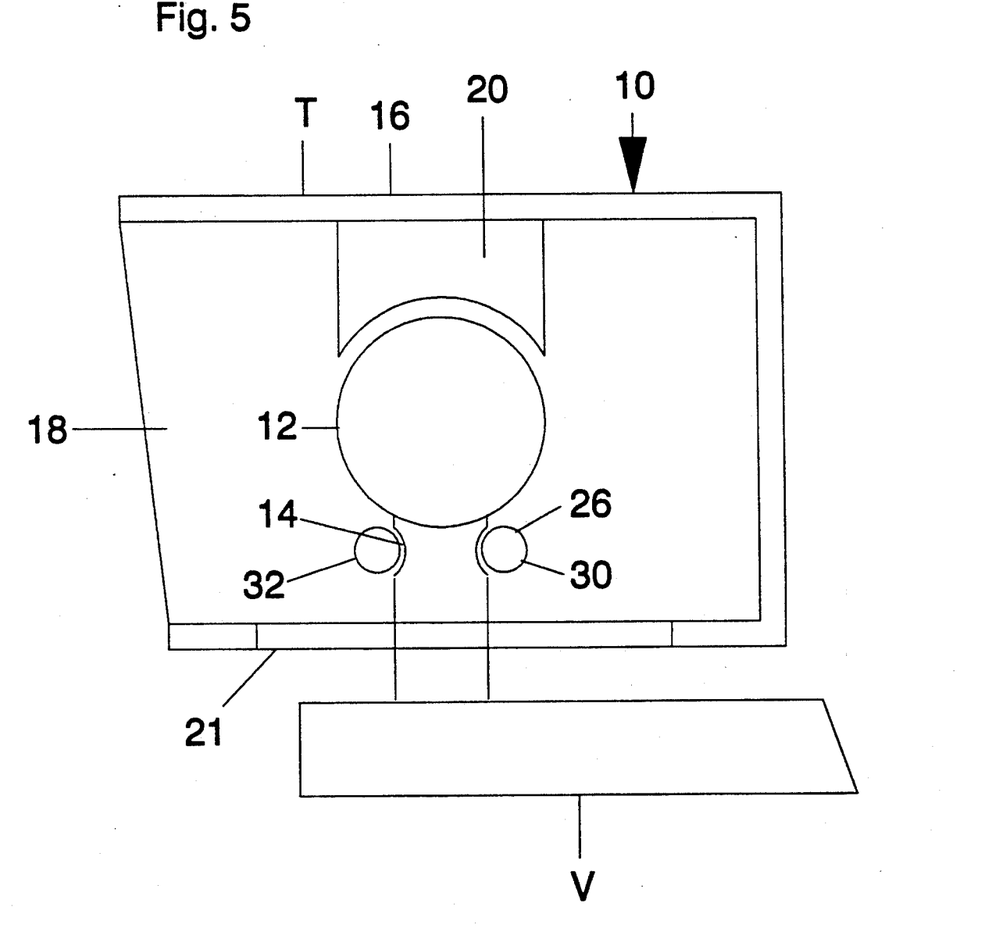
FIG. 5 is a sectional view taken substantially as indicated along the lines 5—5 of FIG. 1.
Figure 6:
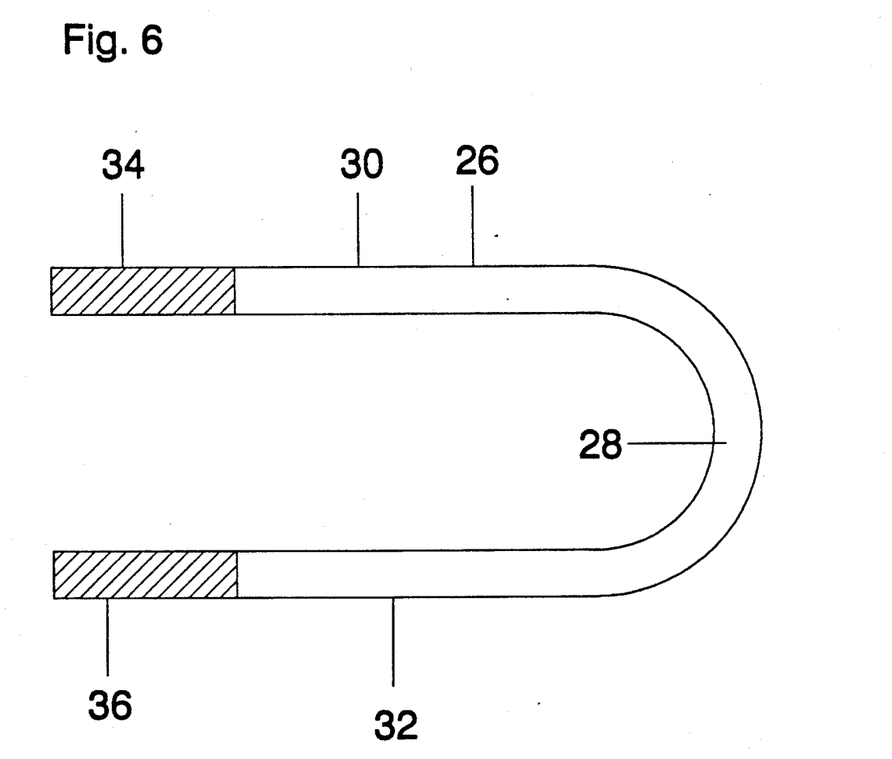
FIG. 6 is a plan view of a U-bolt for the hitch of FIG. 1.

As shown in FIG. 6, the hitch 10 has U-bolt 26 having a curved central portion 28, a pair of aligned pins 30 and 32 extending from the central portion 28, and having respective threaded outer ends 34 and 36. As shown in FIGS. 1–5, after placement of the hitching member 16 on the ball 12, the pins of the U-bolt are passed through the openings 22 and 24 such that the pins are received in the groove 14, and a pair of threaded nuts 38 and 40 may be releasably secured to the ends 34 and 36 of the U-bolt 26 to releasably clamp the hitching member 16 to the ball 12, and lock the trailer to the car.

In this configuration, the hitch permits rotation of the hitching member 16 relative to the ball 12, although the hitching member 16 is clamped to the ball 12. The hitch may be assembled in a rapid and simplified manner, and may also be disassemble in a rapid and simplified manner after use without locking. The hitch 10 minimizes the possibility of detachment during use to provide safety to the user. In addition, the U-bolt for the trailer is of simplified construction and reduced cost, and may be discarded after use.

Figure 7:
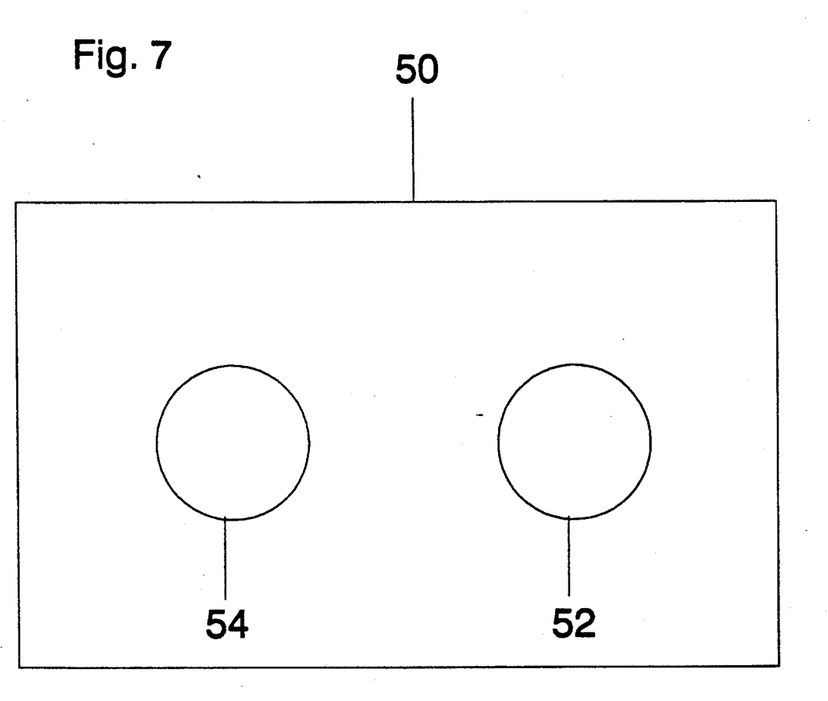
FIG. 7 is a plan view of a plate for the hitch of FIG. 1.
Figure 8:
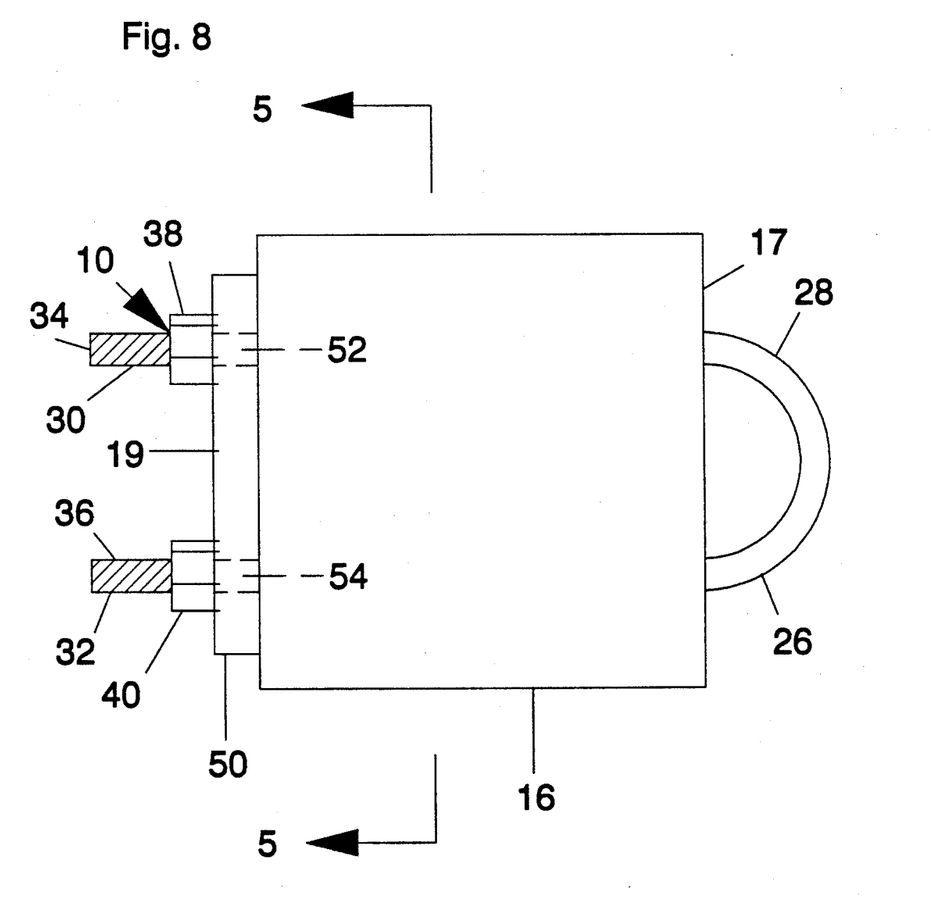
FIG. 8 is a top plan view of the plate secured to the hitch.

Another embodiment of the present invention is illustrated in FIGS. 7 and 8, in which like reference numerals designate like parts. In this embodiment, the hitch 10 has a plate 50 having a pair of spaced openings 52 and 54 which are aligned with the pins 30 and 32, such that the openings 52 and 54 receive the pins 30 and 32 after placement of the U-bolt through the openings 22 and 24, with the plate 50 being received beneath the nuts 38 and 40, respectively. Thus, the nuts 38 and 40 may be secured over the plate 50 in order to clamp the plate 50 in place against a side of the hitching member 16. The plate 50 facilitates attachment of the U-bolt 26 to the hitching member 16, and may be readily removed after use of the hitch 10 by merely removing the nuts 38 and 40 from the hitching member 16.

Figure 9:
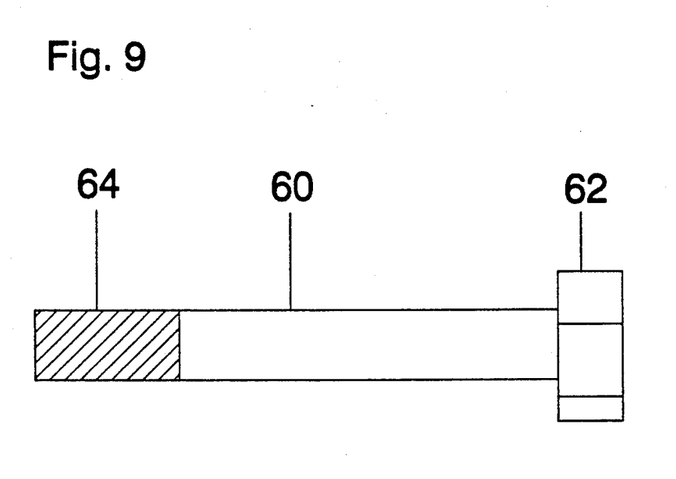
FIG. 9 is a plan view of a bolt for the hitch of FIG. 1.
Figure 10:
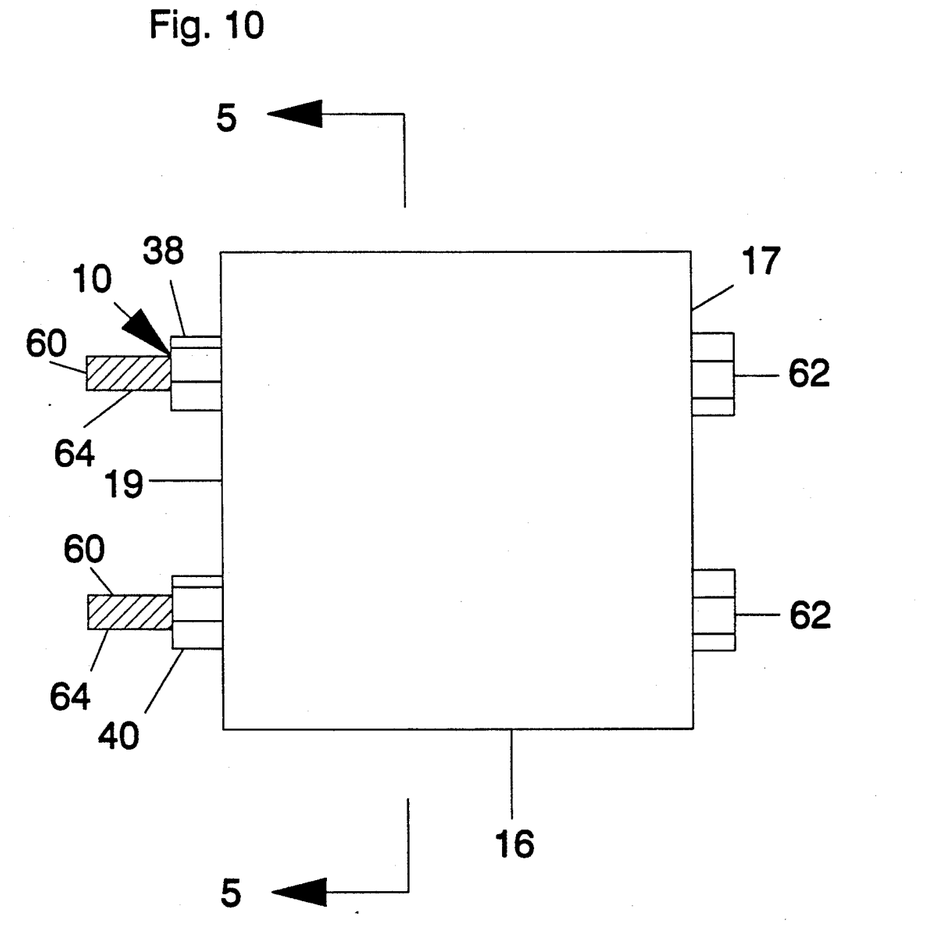
FIG. 10 is a top plan view of the hitch utilizing a pair of the bolts of FIG. 9.

Another embodiment of the present invention is illustrated in FIGS. 9 and 10, in which like reference numerals designate like parts. In this embodiment, the hitch 10 has a pair of elongated bolts or pins 60 having an enlarged head 62 adjacent one end of the bolts 60, and a threaded portion 64 adjacent the other end of the bolts 60, with the pair of bolts 60 replacing the U-bolt 26 in the hitch 10. Thus, the bolts 60 may be passed through the openings 22 and 24 of the hitching member 16, with the bolts 60 being received in the annular groove 14 of the ball 12, and with the nuts 38 and 40 being secured to the threaded ends of the bolts 60 with the plate 50 in place to retain the hitching member 16 to the ball 12 while permitting rotation of the hitching member 16 relative to the ball 12. Thus, the plate 50 may be secured intermediate the nuts 38 and 40 and a wall of the hitching member 16. In other respects, the hitch 10 of FIGS. 9 and 10 operates in a manner as previously described in connection with the hitch 10 of FIGS. 1–5.

Figure 11:
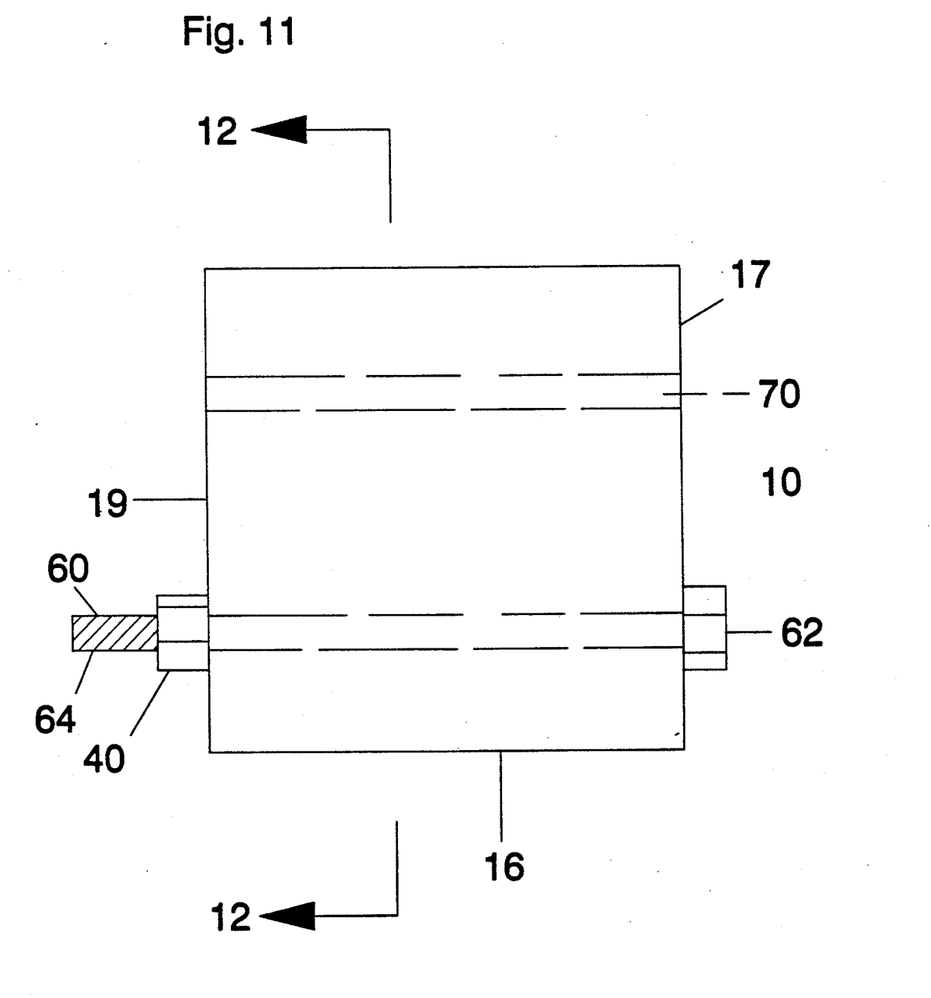
FIG. 11 is a top plan view of another embodiment of a hitch of the present invention.
Figure 12:
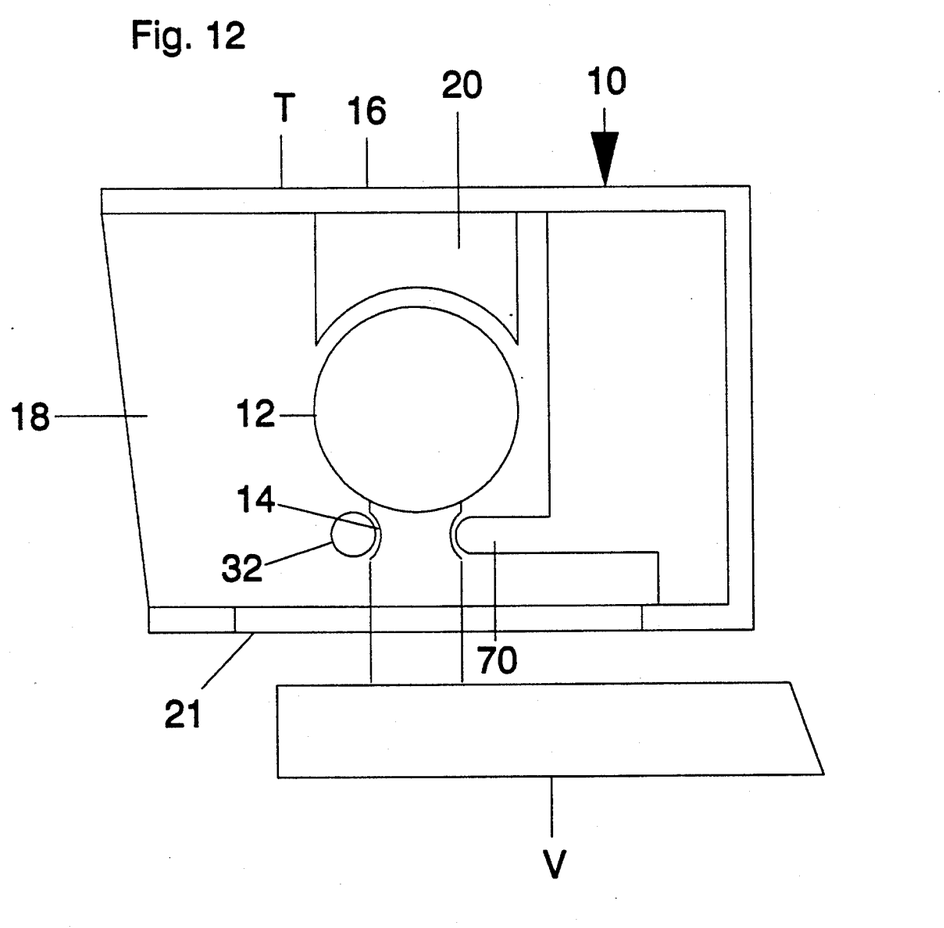
FIG. 12 is a sectional view taken substantially as indicated along the line 12—12 of FIG. 11.

Another embodiment of the present invention is illustrated in FIGS. 11 and 12, in which like reference numerals designate like parts. In this embodiment, the hitch 10 has a first fixed pin or securement member 70 extending across the hitching member 16 in the cavity 18 at a location to be received in the annular groove 14 in one side of the ball 12. The hitch 10 also has a bolt or pin 60 having an enlarged head 62 adjacent one end of the bolt 60, and a threaded portion 64 adjacent the other end of the bolt 60, as previously described. After placement of the hitching member 16 over the ball 12, with the ball 12 received in the cap 20 and the pin 70 received in the annular groove 14 of the ball 12, the bolt 60 is passed through the opening 24 of the hitching member 16, such that the bolt 60 is received in the groove 14 on the other side of the ball 12 relative to the fixed pin 70, and the nut 40 is secured to the threaded portion 64 of the bolt 60 in order to releasably clamp the hitching member 16 on the ball 12 while permitting rotation of the hitching member 16 relative to the ball 12 in a manner as previously described. Thus, the hitch 10 may be clamped simply by using the one bolt or pin 60, thus providing a simplified securement and release of the hitch 10. The bolt 60 is of simplified construction and reduced cost, and may be discarded after use. In other respects, the hitch of FIGS. 11 and 12 operates in a manner as previously described in connection with FIGS. 1–5.

The foregoing detailed description is given for clearness of understanding only, and no unnecessary limitations should be understood therefrom, as modifications will be obvious to those skilled in the art.

What is claimed is:

1. A trailer hitch, comprising:
a hitching ball for a vehicle having an annular groove adjacent the ball;
a hitching member for a trailer having a cavity to receive the ball and a pair of spaced openings extending therethrough and aligned with the groove of the ball;
an elongated U-bolt for passage transversely through the openings and in the groove to retain the hitching member to the ball; and
means for clamping the U-bolt to the hitching member and releasably retaining the U-bolt to the hitch, such that the U-bolt may be discarded after use, wherein the clamping means has a plate with a pair of spaced openings to receive outer ends of the U-bolt adjacent a wall of the hitching member.

2. The hitch of claim 1 wherein the U-bolt has a pair of threaded ends, and wherein the clamping means comprises a pair of threaded nuts.

3. The hitch of claim 1 wherein the hitching member includes a cap for placement over the ball when the ball is placed in the cavity of the hitching member.

4. The hitch of claim 1 wherein the groove is located beneath the ball.

5. The hitch of claim 1 wherein the hitching member includes a pair of spaced and opposed walls partially defining the cavity, and in which the openings extend through the walls.

6. A trailer hitch comprising:
a hitching ball for a vehicle having an annular groove adjacent the ball;
a hitching member for a trailer having a cavity to receive the ball and a pair of spaced openings extending therethrough and aligned with the groove of the ball;
a pair of bolts for passage transversely through the openings and in the groove to retain the hitching member to the ball; and
means for clamping the bolts to the hitching member and releasably retaining the bolts in the hitch, such that the bolts may be discarded after use, wherein the clamping means includes a plate having a pair of apertures aligned with said openings of the hitching member, with the plate being received on outer ends of the bolts.

7. The hitch of claim 6 wherein the clamping means comprises a pair of threaded ends of the bolts, and a pair of threaded nuts received on the threaded ends of the bolts.

* * * * *